United States Patent Office 3,479,149
Patented Nov. 18, 1969

3,479,149
PROCESS FOR REDUCING CARBON DIOXIDE
WITH HYDROGEN TO CARBON MONOXIDE
Vincent J. Frilette, Delaware Township, Camden County,
N.J., assignor to Mobil Oil Corporation, a corporation
of New York
No Drawing. Filed Sept. 10, 1963, Ser. No. 307,785
Int. Cl. C01b *31/18, 33/26, 33/24*
U.S. Cl. 23—204
4 Claims This invention relates to a process for conducting reduction reactions among gaseous reactants in the presence of a crystalline aluminosilicate catalyst of ordered internal structure. More specifically, the invention relates to the catalytic interconversion of combustable gases, by either a batch or continuous process.

Industry has long sought an improved process by which the ratio of carbon monoxide and hydrogen in a gas mixture may be catalytically altered. There also has been a need for new and better methods for the catalytic interconversion of gaseous materials, for the production of hydrogen and for improved methods for drying or eliminating water from various organic or inorganic materials.

Gases and mixtures of gases which contain hydrogen and/or carbon monoxide are of considerable commercial and technological importance. For example, they are extensively used as fuels. Coal or carbon containing liquids may be gasified by pyrolysis or reaction with air and/or steam at elevated temperatures to produce various forms of manufactured gas which contain either hydrogen or carbon monoxide or both. These gases are also useful in metallurgical processes as well as in various chemical processes which require one or the other or a mixture of hydrogen and carbon monoxide in some preferred ratio. Several chemical processes employ hydrogen. Examples of these processes are the synthesis of ammonia, synthesis of methanol, Fischer Tropsch synthesis, the Bergius process and the catalytic desulfurization of petroleum compounds where the by-product is hydrogen sulfide.

The present invention relates to a method of manufacturing gases and mixtures of gases which contain hydrogen and/or carbon monoxide, which process is also highly useful in fuel gas reforming, the dehydrogenation of hydrocarbons and in the catalytic cracking of hydrocarbons to maintain a minute but controlled level of water in the reaction zone.

Accordingly, an object of this invention is the catalytic production of either hydrogen or carbon monoxide by use of a novel catalyst.

Additionally, an object of this invention is to provide a means for reducing a gaseous reducible chemical compound with a gaseous reducing agent in the presence of a crystalline aluminosilicate catalyst.

A further object of this invention is to provide processes for carrying out a gaseous reduction, either as a continuous or a batch process in the presence of such a catalyst.

A further object of this invention is to provide a method for dehydrating an organic or inorganic material such as a molecular sieve by the use of a highly efficient catalytic process.

Another object of this invention is the catalytic method for the interconversion of various combustible gases.

A further object of this invention is to provide novel catalytic means for shifting the equilibrium of a system in which both hydrogen and carbon monoxide are participants of the equilibrium reaction.

Another object of this invention is to provide a process by which the ratio of carbon monoxide and hydrogen in a gas may be catalytically altered.

It is a further object of this invention to provide a process for the manufacture of either hydrogen, carbon dioxide or carbon monoxide.

Another object of this invention is to provide a process for drying an aluminosilicate material, known in the art as molecular sieves, by contacting the sieve with CO and withdrawing $CO_2$ and $H_2$ until no additional $CO_2$ is formed.

This invention provides a method for fulfilling the needs of the art whereby the objects of the present invention are achieved in a novel way by reacting combustible or reducible gases in the presence of a catalyst comprising a crystalline metal aluminosilicate catalyst of highly ordered internal structure. These catalysts primarily differ from conventional catalysts in that they have a high degree of crystallinity or ordered internal structure, uniform pore size, high activity, and resistance to catalytic poisons, especially sulfur compounds.

The usual catalyst for effecting the interconversion of carbon monoxide and hydrogen is iron oxide promoted with chromium. However, according to the present invention, it has surprisingly been found that crystalline aluminosilicates, substantially devoid of iron, chromium and transition elements, catalyze this reaction.

Generally, the catalysts with which this invention is concerned are crystalline metal aluminosilicates. These materials are possessed of very high surface area per gram and are microporous. The ordered crystalline structure gives rise to a definite pore size, related to the structural nature of the ordered internal structure. Several synthetic forms are commercially available, as well as many natural crystalline aluminosilicates.

The composition of the zeolitic structures contemplated by this invention includes exchangeable metal ions, silicon, aluminum and oxygen arranged in a definite and consistent crystalline pattern. Such structure contains a large number of small cavities, interconnected by a number of still smaller channels. These cavities and channels are precisely uniform in size. Chemically these zeolites may be represented by the general formula:

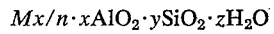

$$Mx/n \cdot xAlO_2 \cdot ySiO_2 \cdot zH_2O$$

where M is a metal cation and $x/n$ is the number of exchangeable metal cations of valence $n$, and $x$ is also the number of aluminum ions combined in the form of aluminate, $y$ is the number of silicon atoms and $z$ is the number of water molecules, removal of which produces the characteristic channel system common to this class of crystalline materials.

The suitability of crystalline aluminosilicate materials for the interconversion process of this invention is to a great extent determined by the nature of the exchangeable cations present in the catalyst. For example, the order of increasing effectiveness of various solid compositions which contain silica and alumina can be given by way of example by the following series: amorphous aluminosilicic acids (e.g. silica-alumina cracking catalyst), essentially ineffective; crystalline aluminosilicic acids and divalent or polyvalent metal salts thereof (e.g., hydrogen mordenite, the calcium salt of the "A" zeolite or of faujasite, and the rare earth salts of faujasite), moderately effective; and the monovalent metal salts (e.g., sodium mordenite, sodium faujasite), highly effective.

Various exchangeable cations and mixtures thereof may be introduced by base-exchange techniques well known in the art. In any event, the exchanged zeolite should be stable on dehydration and give the X-ray diffraction pattern characteristic of the crystalline aluminosilicate employed.

Electropositive metal ions are generally preferred for this base-exchange process, especially the alkali metal cations. However, many other metal ions either alone, in combination with one another or in combination with alkali metal cations may be used. These cations may be subdivided into those which are difficultly reducible and those which are easily reducible; in the first category would be those having standard electrode potential greater than +0.50 volt, and in the second category, those with less than 0.50 volt. The elements Li, Rb, K, Sr, Ba, Ca, Na, Mg, Cr, Ga fall into the first category, whereas Fe, Co, Cd, Ni, Cu, Ag, Pd fall into the second category.

In some instances, catalytic advantages can be realized by contacting aluminosilicate salts which contain difficultly reducible cations with solutions containing one or more easily reducible cations to deposit limited quantities of the latter within the intracrystalline pores of the aluminosilicate.

Additionally, the total cations exclusive of hydrogen within the crystalline aluminosilicate may vary from 0.5 milliequivalent to 15 milliequivalents per gram of crystalline aluminosilicate salt in the preferred catalyst.

One natural material of particularly high activity is mordenite. Mordenite is a crystalline material occurring naturally as the hydrated salt corresponding to:

$$Na_8(AlO_2)_8(SiO_2)_{40} \cdot 24H_2O$$

This mordenite material may be leached with dilute hydrochloric acid to arrive at an H or acid form. In a specific example, the mordenite material may be so treated as to have more than 50% in the acid form.

Another suitable catalyst is synthetic faujasite, also known as 13X molecular sieve, described in U.S. Patent No. 2,882,244. This molecular sieve is an excellent catalyst in the sodium form; optionally it may be base exchanged with a solution of rare-earth chlorides (containing 4% of rare earth trichloride hexahydrates) at 180–200° F. to remove sodium ions from the aluminosilicate complex and replace at least some of them with the chemical equivalent of rare-earth ions for certain embodiments of this invention. After washing free of soluble material and drying, there is produced a rare-earth exchanged X-type aluminosilicate containing 1.0–1.5% (wt.) of sodium and about 25% (wt.) of rare-earth ions calculated as trivalent rare-earth oxides.

A 5A material indicates a synthetic crystalline aluminosilicate of A structure in the calcium form that has a pore size of about 5 A. diameter. Another commercially available crystalline aluminosilicate is synthetic faujasite, sometimes designated the X structure and having 10–13 A. pore diameter. A more siliceous variety of faujasite, also known as the Y structure, may be synthesized. Another commercially available crystalline aluminosilicate is a synthetic mordenite known as "Zeolon." The salts of these materials may be interconverted, and some may be converted to the "H" or acid form, wherein a hydrogen occupies the cation site. For example, such a conversion may be had by ion-exchange with an ammonium ion, followed by heating to drive off $NH_3$ or by controlled acid leaching. In general, the crystal is more stable in materials having higher Si/Al atom ratios, such as 1.25/1 and above.

A wide variety of natural and synthetic crystalline aluminosilicates may be used as catalysts, in many instances with little or no preparation other than transformation into a suitable physical form. Such transformations include grinding or pulverizing, sieving, compacting with or without added agents, and pelletizing. Natural mordenite in the form of beach pebbles is best transformed by grinding to a fine powder followed by recompaction to make accessible the multitude of channels for entry and egress of reactants and products. This illustration, given by way of example, is nonlimiting. Those skilled in the art will readily recognize the desirable physical transformations that may suggest themselves, depending on the nature of the raw material and the specific embodiment of this invention which it is desired to practice, for the large number of natural crystalline aluminosilicates such as chabazite, gmelinite, mordenite, dachiardite, erionite, paulingite, ptiolite, etc., that may be used. These remarks apply equally well to synthesized crystalline aluminosilicates. In some instances, more desirable results will be obtained by base-exchanging the crystalline aluminosilicate prior to, during, or subsequent to, the indicated physical transformation.

According to the invention, the aluminosilicate may be composited with relatively inactive matrix material. The amount of active component in the composite may be varied within wide limits and may also vary as to the nature of the aluminosilicate employed, the cation character and concentration, and the nature of added components incorporated by precipitation in the pores thereof.

Particularly important variables in aluminosilicate structure are selection of cations, the silicon to aluminum atom ratio, pore diameter, and spatial arrangement of cations. The cations may be protons (acid) derived by base exchange with solutions of acids or ammonium salts, the ammonium ion decomposing on heating to leave a proton. Preferably, the cations are cations derived from electropositive metals which form strong bases in aqueous solution. Especially preferred are the alkali metal cations such as lithium, sodium, potassium, rubidium and caesium. The crystalline aluminosilicates also should possess pore openings of at least about 3 A. as evidenced by ability to sorb substantial quantities of water after evacuation at elevated temperature.

In general, the method of the invention comprises contacting reactant gases in the presence of a crystalline aluminosilicate catalyst and under suitable conditions of temperature and pressure.

Since the invention is applicable in a variety of reactions, the scope of the invention will perhaps be better understood in light of the following detailed examples.

The following examples demonstrate the interconversion of carbon monoxide and water to carbon dioxide and hydrogen and vice versa according to the following reaction:

$$CO + H_2O \rightleftharpoons CO_2 + H_2$$

EXAMPLE 1

$CO_2$ and $H_2$ were continuously metered at a rate of approximately 3.5 ml./min. and 6.5 ml./min. respectively into a reaction chamber which was maintained at 1000° F. and atmospheric pressure. The gases were dehydrated prior to entering the reactor by being passed through a tube containing "Drierite," a commercial desiccant.

In the reactor the gases were contacted with 2.0 grams of a synthetic faujasite, i.e. crystalline sodium aluminosilicate, known as 13X molecular sieve.

The product gases were continuously withdrawn, were dehydrated by contact with "Drierite" and were sampled and analyzed.

EXAMPLE 2

The same reaction was conducted as in Example 1, but a synthetic faujasite similar to 13X made under conditions to insure the essential absence of impurity elements, and containing only 37 p.p.m. of iron by analysis, was employed. This catalyst was designated "Pure" 13X.

EXAMPLE 3

The same reaction was conducted as in Example 1, but the sodium salt of a synthetic mordenite, "Zeolon-Na," was employed as catalyst.

EXAMPLE 4

The same reaction was conducted as in Example 1, but a synthetic acid mordenite "Zeolon-H" catalyst was employed.

EXAMPLE 5

The same reaction was conducted as in Example 1, but a synthetic calcium crystalline aluminosilicate, known as 5 A. molecular sieve was employed.

EXAMPLE 6

The same reaction was conducted as in Example 1, but a synthetic calcium faujasite, known as 10X molecular sieve, was employed as catalyst.

EXAMPLE 7

The same reaction was conducted as in Example 1, but an amorphous silica-alumina gel cracking catalyst was employed.

The results of the reactions described in Examples 1 through 7 appear in the following table, Table I.

TABLE I

| Catalyst | $\frac{CO^1}{CO+CO_2} \times 100$ | Wt. Water Recovered Per Hour, grams |
|---|---|---|
| Example: | | |
| 1 — Synthetic faujasite, molecular sieve 13X | 34.5, 31.7 | 0.056 |
| 2 — "Pure" 13X | 34.8, 37.8 | 0.048 |
| 3 — Synthetic Mordenite, "Zeolon-Na" | 11.8, 11.1 | 0.018 |
| 4 — Synthetic acid mordenite "Zeolon-H" | 4.3 | 0.005 |
| 5 — Synthetic Calcium Aluminosilicate, molecular sieve 5A | 3.2, 3.3 | 0.01 |
| 6 — Synthetic Calcium Faujasite molecular sieve 10X | 0.9 | 0.002 |
| 7 — SiO₂/Al₂O₃ gel | 0.6 | 0.001 |

[1] Mole percent from mass spectrographic analysis of samples taken during run.
[2] Water covered in "Drierite" trap after reaction.

The data indicate that the reaction of $CO_2$ and $H_2$ to produce CO and $H_2O$ is accomplished to some extent over each catalyst. The crystalline aluminosilicate catalysts, however, are much more effective than the amorphous silica-alumina gel. Also, among the aluminosilicates, the synthetic sodium faujasites, molecular sieve 13X (Example 1) and "Pure" 13X (Example 2) and sodium mordenite (Example 3) are especially active.

The following examples illustrate the production of $H_2$ and $CO_2$ from CO and $H_2O$.

EXAMPLES 8-16

In Examples 8–13, $H_2$ and $CO_2$ was produced from CO and $H_2O$ by catalysis with synthetic faujasite (molecular sieve 13X) and synthetic sodium mordenite (Zeolon-Na) crystalline aluminosilicates.

The reactions of Examples 8–16 were conducted in the same system which was employed in Examples 1–7, with slight modification. The drying tube before the reactor was replaced by a water saturator which was thermostated in a water bath at 80° C. ±3° C. Carbon monoxide, at 1 atm., was passed through the water to provide a mixed CO–$H_2O$ stream, and the mixture was passed over the catalyst.

The results of these reactions are shown in the following table:

TABLE II

| Ex. | Catalyst | Reaction Time, °F. | Analysis, Mol percent [1] | | |
|---|---|---|---|---|---|
| | | | Hydrogen | CO | CO₂ |
| 8 | Synthetic faujasite (13X) | 400 | 0.0 | 100.0 | 0.0 |
| 9 | do | 600 | 0.0 | 99.0 | [2] 1.0 |
| 10 | do | 700 | 4.0 | 89.7 | [2] 5.2 |
| 11 | do | 800 | 18.3 | 62.4 | 19.3 |
| 12 | do | 900 | 30.6 | 37.3 | [2] 32.1 |
| 13 | do | 1,000 | 27.6 | 44.4 | 28.0 |
| 14 | Synthetic mordenite, "Zeolon-Na" | 800 | 12.0 | 74.6 | [2] 13.4 |
| 15 | do | 900 | 15.8 | 65.1 | [2] 19.1 |
| 16 | do | 1,000 | 17.9 | 61.7 | [2] 20.4 |

[1] The mole percent of CO, CO₂, and H₂ is based on mass spectrographic analysis.
[2] The calculated pressure is considerably lower than actual, indicating possible formation of hydrocarbons and oxygenated carbon compounds other than CO and CO₂.

The following example illustrates the use of the catalytic interconversion reaction to dry a crystalline aluminosilicate.

EXAMPLE 17

Benzene, containing 0.1 wt. percent water, was passed continuously over a bed of dry 4A crystalline aluminosilicate to reduce the water content to less than 50 p.p.m. After the drying capacity of the bed was exhausted, the benzene stream was stopped and the temperature raised to 800° F. while simultaneously a stream of CO was flowed through the bed and any $CO_2$ and $H_2$ formed was removed. When the $CO_2$ formation substantially ceased, the temperature was again lowered and the benzene drying operation was reinstituted, completing the cycle.

The following example illustrates the catalytic chemical drying of benzene.

EXAMPLE 18

Benzene vapor containing 0.1 wt. percent water was mixed with CO and the mixture passed in vapor phase over a bed of sodium mordenite at 650° F. After passage through the bed, the vapors were cooled to separate the dried benzene, unconsumed CO, $CO_2$ and $H_2$. The recovered gas may be recycled after removal of the $CO_2$ by conventional means.

It is obvious that other gases, inorganic vapors and organic vapors can be dried by this process, for example, N, He, Ne, A, Kr, Xn, and Rn. These are not intended to be exhaustive of the gases which can be so treated but rather are nonlimiting examples.

The temperatures at which the interconversion reaction may be conducted vary widely. They are, however, determined to some extent by the equilibrium laws which apply to the basic reaction shown above. These equilibrium laws are well recognized and should be considered in any specific embodiment of this invention. In general, the reaction in which carbon monoxide is converted to hydrogen is favored by lower temperatures, and may be effectively carried out at temperatures ranging from about 300° F. to 1400° F. Above this temperature, the equilibrium limitations begin to seriously hamper the formation of hydrogen. For this conversion, 1 mol of CO is diluted with from 1 to 100 mols of steam. For reactions in which hydrogen is converted to carbon monoxide, it is preferred to operate at elevated temperatures, say in the range of 1400° F. down to 700° F. Both reactions may be conducted over a very wide range of pressures, ranging from subatmospheric partial pressure of either carbon monoxide or hydrogen to 500 atm.

A particularly important application of the present invention is concerned with the efficient conversion of CO by steam to hydrogen and $CO_2$ for the manufacture of high purity hydrogen. Crude hydrogen, produced by the steam-reforming of methane, contains considerable quantities of CO. The present invention contemplates the efficient conversion of the undesired CO by treatment of a mixture of one mol crude hydrogen as dry gas with 0.2 to 20.0 mols steam under the conditions of temperature and pressure indicated in prior paragraphs.

The method of heating the reactants of this invention can be varied widely; for instance, the reactants can be preheated then introduced into the catalytic zone or introduced into the catalytic zone and then heated, or both or any combination thereof. It is also contemplated to preheat the reactants or catalyst with the reaction products or both or any combination thereof.

It should also be noted that the upper temperature limit of this invention is that point at which the catalyst loses its ordered internal structure whereas the lower temperature limit is that where no reaction takes place after the reactants have been exposed to the catalyst for a reasonable length of time.

Although specific catalysts and reaction conditions have been given in the above examples, other catalysts for the interconversion of carbon monoxide and hydrogen are also contemplated and broadly include the salts of crystalline aluminosilicates. As specific examples, we may mention zeolite A, zeolite X, natural mordenite, synthetic mordenite known as "Zeolon," zeolite T, and various rare earth ion-exchanged crystalline aluminosilicates. The crystalline aluminosilicates need not be entirely in the salt form, so long as substantial mobile cation other than hydrogen is present. In general, better catalyst stability will be achieved by the use of aluminosilicates which do not degrade too readily in the presence of steam. In general, the steam stability of aluminosilicates in a homologous series such as the faujasite series, which includes zeolites X, Y, and faujasite, is improved as the silica to alumina ratio is increased. In a preferred embodiment of this invention, the crystalline aluminosilicate has a silicon to aluminum atomic ratio of at least 1.25 and preferably greater than 1.75.

Other zeolite catalyst compositions are contemplated and are to be considered within the broad scope of this invention. The following compositions should also be considered as part of the invention:

(a) *Zeolite A* is a synthetic, commercially produced material. Like all zeolites, it can exist in a variety of ion-exchange forms. The effective intracrystalline channel diameter as well as the catalytic efficiency of this zeolite depends upon the ion in the exchange sites, for example:

(1) The potassium form (3A molecular sieve) has an effective channel diameter of 3 A.,
(2) The sodium form (4A molecular sieve) has an effective channel diameter of 4 A.,
(3) The calcium form (5A molecular sieve) has an effective channel diameter of 5 A.

(b) *Zeolite ZK–4* is a synthetic material whose crystal structure is similar to zeolite A. Tetramethylammonium hydroxide is used in the synthesis. Zeolite ZK–4 contains more silica and less alumina and exchangeable cations than does zeolite A. This difference in composition is reflected in the increased stability of the hydrogen form of ZK–4 relative to the A form. The effective channel diameter of the sodium form of zeolite ZK–4 is 5 A.

(c) *Zeolite α* is a very highly siliceous form of zeolites A and ZK–4. Unlike zeolites A and ZK–4, this zeolite is stable when all the exchangeable cations are hydrogen.

(d) *Zeolite X* is a synthetic faujasite produced commercially, and it has the same crystal structure as naturally-occurring faujasite. This zeolite in the sodium form is called 13X molecular sieve. In the calcium form it is called 10X molecular sieve. Unlike most zeolites, it can sorb molecules with molecular diameters up to about 10 A. Such molecules would include branched chain hydrocarbons, cyclic hydrocarbons and even certain alkylated cyclic hydrocarbons.

(e) *Zeolite Y* is a group of materials possessing the same crystal structure as zeolite X. Zeolites of the Y group contain more silica and less alumina than zeolite X. In accordance with the general behavior of zeolites, as the silica content is increased, the crystal structure becomes more stable to heat, steam and hydrogen ions. Unlike zeolite X, the crystal lattices of the more silica-rich members are stable when all of the exchangeable cations are hydrogen.

(f) *Mordenite* is a naturally occurring zeolite originally synthesized by R. M. Barrer. Synthetic mordenite is available commercially under the name Zeolon. Mordenite, synthetic and natural, is very rich in silica and is unusually steam stable and stable to hydrogen ion and acids. It is a very active hydrocarbon conversion catalyst in the hydrogen form. It can sorb simple cyclic hydrocarbons but cannot sorb large molecules as do zeolites X and Y. It readily sorbs CO, $CO_2$, $H_2O$ and $H_2$.

(g) *Zeolite ZK–5* is a synthetic zeolite. Triethylene-diamine is used in its synthesis. It sorbs straight chain hydrocarbons but excludes branched chain and cyclic hydrocarbons. This zeolite has the same silica content as the more silica-rich zeolites of the Y group and thus is stable when all of the exchangeable cations are hydrogen.

Some of the natural zeolites useful in accordance with the invention include: analcite, paulingite, ptilolite, clinoptilolite, ferrierite, chabazite, gmelinite, levynite, erionite, and faujasite.

Other synthetic crystalline aluminosilicates useful in the invention include: zeolite E, zeolite F, zeolite G, zeolite K–G, zeolite H, zeolite J, zeolite L, zeolite M, zeolite K–M, zeolite Q, zeolite R, zeolite S, zeolite T, zeolite U, and zeolite Z.

Certain feldspathoids are also useful in the invention. Feldspathoids are crystalline aluminosilicates which contain intercalated (or occluded) salts and bases. These intercalated materials usually "stuff" the crystal structure, thus precluding absorption of vaporous materials. Some naturally occurring feldspathoids include: leucite, kalsilite, kaliophilite, nepheline, sodalite, noselite, houynite, lazurite, and cancrinite.

Although this invention specifically relates to the chemical interconversion of carbon monoxide and hydrogen, it also broadly applies to any gaseous reducible chemical compound that can be caused to react by a reducing agent. Broadly speaking, most carbon compounds containing the chalcogens which include oxygen, sulfur, selenium and tellurium as well as the non-metals are capable of being reduced, whereas most chemical compounds containing the metals and hydrogen are capable of acting as reducing agents under proper conditions.

It should also be noted that carbon compounds having a valence less than 4 can also act as reducing agents, a typical example of which is the divalent carbon or carbon monoxide. Other examples of carbon atoms having a valence less than 4 are the triphenyl methyl radical produced by the disassociation of hexaphenylmethane into two free radical compounds and carbonium ions. For purposes of definition, a "hydrogen-containing compound" as used in the specification refers to both atomic hydrogen and molecular hydrogen.

The specific examples given above refer to processes which are continuous in nature. However, the reaction may be conducted in a batch method by either using a closed reaction vessel or by introducing the reactants into apparatus analogous to that previously described and sealing off both ends of the tube. Regardless of method of operation, a contact time of from 0.01 to 1000 seconds, and preferably from 1 to 100 seconds, per volume of gas equal to the apparent volume (i.e., bulk volume) of catalyst is required for the process of this invention. The longer the contact time, in general, the greater will be the extent of attainment of equilibrium.

Although specific examples are given for the process of this invention, it is also contemplated that various mixtures of starting materials and catalysts can be used in order to achieve the objects of this invention.

The interconversion reaction may be utilized in connection with other catalyzed or thermal reactions or conjointly with other reactions capable of being catalyzed by crystalline aluminosilicates. For example, dehydrogenation reactions are frequently limited in conversion due to the equilibrium which exists at the operable temperatures for the dehydrogenation. In such cases, by conducting the reaction of carbon dioxide and hydrogen by introducing carbon dioxide into a reaction zone which contains a crystalline aluminosilicate salt, the hydrogen is consumed to form carbon monoxide and water thereby permitting further dehydrogenation of the hydrocarbon. Similarly, should one wish to remove limited amounts of water from various reactions, the introduction of carbon monoxide to react with the water forming carbon dioxide and hydrogen is feasible. Reference to the general equation $CO + H_2O \rightleftharpoons CO_2 + H_2$ suggests that the interconversion also is useful for the introduction of small amounts of one of the four compounds into a catalytic reaction zone. For example, by cracking a hydrocarbon in the presence of carbon dioxide, it is believed that the small amounts of hydrogen produced react with the carbon dioxide to provide controlled low levels of water which serve to activate the catalyst for cracking. Numerous other examples might be cited to illustrate the potential usefulness of the combined interconversion of carbon monoxide and hydrogen with another catalytic activity in the reaction zone.

It is further contemplated that this reaction is applicable to processes of decoking, fuel gas reforming and the catalytic desulfurization of organic compounds with hydrogen or any other gaseous reducing agent. It is also contemplated that the process of this invention is applicable to catalytic dehydrogenation using the water gas reaction.

It has been indicated that steaming has a tendency to reduce the activity of the catalyst under consideration and that during the decoking of this catalyst, water is formed as a by-product of the reaction and has a tendency to convert to steam at the decoking temperatures. Carbon monoxide is also formed, and it is therefore obvious that the water can be reduced to carbon dioxide by the process of this invention thereby eliminating a potential catalyst deactivator. The carbon dioxide also produced during the decoking process can be reduced by carbon on the catalyst to form carbon monoxide for reacting with the water as described above. Also, a reducible carbonaceous deposit on a catalyst may be removed, by heating with $CO_2$, according to the approximate equation $$2C[H] + 3CO_2 \rightarrow 5CO + H_2O$$

This process is also applicable to the method of the manufacture of synthesis gas, whereby carbon monoxide and hydrogen are produced by the combustion of methane and pure oxygen. The method of this invention can be employed to completely convert the synthesis gas to either carbon monoxide or hydrogen.

An alternate method of manufacturing synthesis gas is by the water-gas process wherein water is passed over hot carbon and converted into hydrogen and carbon monoxide. According to the present invention, the water present in this process can also be utilized to convert completely the carbon monoxide into hydrogen gas. Stated otherwise, this water can be reduced further by the carbon monoxide to produce carbon dioxide and additional hydrogen gas.

During various catalytic processes employing hydrocarbon materials and the class of catalysts described above, carbon containing, reducible deposits sometimes build up on the crystalline aluminosilicates. It is contemplated that contacting these deposits on the crystalline aluminosilicate with carbon dioxide under reaction conditions of temperature and pressure in order to reduce the reducible carbon in such deposits may be accomplished satisfactorily in accordance with this invention.

It is further within the purview of this invention to provide a method for purifying a hydrogen stream contaminated by a minor proportion of carbon monoxide by contacting such stream with a crystalline aluminosilicate and removing the carbon monoxide depleted hydrogen from the reaction zone. The aluminosilicate containing sorbed carbon monoxide is thereafter suitably contacted under reaction conditions with a reducible oxygen-containing gas, thereby effecting removal of the sorbed carbon monoxide from the crystalline aluminosilicate, after which, the crystalline aluminosilicate may again be brought into contact with a hydrogen stream containing a small amount of carbon monoxide and the above-described process repeated on a cyclic basis.

It will be apparent to those skilled in the art that various modifications may be made in the disclosed methods without departing from the scope of the invention as expressed in the following claims.

What is claimed is:

1. In a process for converting carbon dioxide by a reduction reaction wherein carbon dioxide is reacted with hydrogen gas to produce carbon monoxide and water according to the equation $$CO_2 + H_2 \rightleftharpoons CO + H_2O$$

wherein the improvement comprises carrying out the reaction in an atmosphere of reactable gases consisting essentially of carbon dioxide, hydrogen, carbon monoxide and water vapor at a temperature of about 700° F.–1400° F. and at a pressure between subatmospheric and 500 atmospheres in the presence of a solid porous crystalline aluminosilicate catalyst having an ordered internal structure and substantially uniform pores with a pore diameter of about 5 to 13 angstrom units so that the production of carbon monoxide and water predominates over the competing reaction to produce carbon dioxide and hydrogen, and recovering the gaseous reaction products.

2. In a process according to claim 1, wherein the crystalline aluminosilicate catalyst has a pore diameter of about 13 angstrom units.

3. In a process according to claim 1, wherein the reaction is carried out at about atmospheric pressure.

4. In a process for converting carbon dioxide by a reduction reaction wherein carbon dioxide is reacted with hydrogen gas to produce carbon monoxide and water according to the equation $$CO_2 + H_2 \rightleftharpoons CO + H_2O$$

wherein the improvement comprises carrying out the reaction at a temperature of about 700° F.–1400° F. and at a pressure between subatmospheric and 500 atmospheres in the presence of a solid porous crystalline aluminosilcate catalyst selected from the group consisting of synthetic faujasite and sodium mordenite and having an ordered internal structure and substantially uniform pores with a pore diameter of about 5 to 13 angstrom units so that the production of carbon monoxide and water predominates over the competing reaction to produce carbon dioxide and hydrogen, and recovering the gaseous reaction products.

References Cited

UNITED STATES PATENTS

| 1,719,867 | 7/1929 | Arsem. | |
| 1,831,179 | 11/1931 | Jaeger. | |
| 1,913,364 | 6/1933 | Bader et al. | |
| 2,967,159 | 1/1961 | Gladrow et al. | |
| 2,971,903 | 2/1961 | Kimberlin et al. | |
| 3,033,642 | 5/1962 | Bukata et al. | 23—2.1 |
| 3,181,928 | 5/1965 | Frilette et al. | 23—2.2 |
| 3,033,778 | 11/1958 | Frilette. | |
| 2,882,243 | 4/1959 | Milton | 23—112 XR |

(Other references on following page)

| | | | |
|---|---|---|---|
| 2,882,244 | 4/1959 | Milton | 23—112 XR |
| 3,111,387 | 11/1963 | Avery et al. | 23—212 |
| 3,130,006 | 4/1964 | Rabo et al. | 23—110 |
| 2,971,824 | 2/1961 | Johnson et al. | 252—455 |
| 2,983,580 | 5/1961 | Kerr | 23—203 |
| 3,185,540 | 5/1965 | Breck et al. | 252—455 X |
| 3,186,789 | 6/1965 | Ward et al. | 23—2.1 X |

EDWARD STERN, Primary Examiner

U.S. Cl. X.R.

23—110, 150, 210, 213; 252—455; 260—674, 701